United States Patent
Konruff et al.

(10) Patent No.: US 9,528,594 B2
(45) Date of Patent: Dec. 27, 2016

(54) LUBRICATION SYSTEM FOR A GEAR BOX AND ASSOCIATED METHODS

(71) Applicant: Baldor Electric Company, Fort Smith, AR (US)

(72) Inventors: Michael E. Konruff, Simpsonville, SC (US); Chuong Nguyen, Simpsonville, SC (US); Charles Richard Russell, Greenville, SC (US); Jack Dean Asher, Greenville, SC (US); John William DeJong, II, Greenville, SC (US); Thomas F. Esterle, Greenville, SC (US)

(73) Assignee: Baldor Electric Company, Fort Smith, AR (US)

( * ) Notice: Subject to any disclaimer, the term of this patent is extended or adjusted under 35 U.S.C. 154(b) by 155 days.

(21) Appl. No.: 14/477,166

(22) Filed: Sep. 4, 2014

(65) Prior Publication Data

US 2016/0069446 A1  Mar. 10, 2016

(51) Int. Cl.
*F16H 57/04* (2010.01)
*F01M 11/03* (2006.01)
(Continued)

(52) U.S. Cl.
CPC .......... *F16H 57/0441* (2013.01); *F01M 11/02* (2013.01); *F01M 11/03* (2013.01);
(Continued)

(58) Field of Classification Search
CPC ................... F16H 57/0441; F16H 2057/0056; F16H 2057/02017; F16H 2057/02026; F16H 39/04; F16H 39/06; F16B 5/00; F16B 5/0012; F16B 5/0056; F01M 2011/021; F01M 2011/031; F01M 11/02; F01M 11/03; F01M 11/04; F16M 13/02
(Continued)

(56) References Cited

U.S. PATENT DOCUMENTS 1,299,156 A    4/1919  Fast
2,277,738 A *  3/1942  Wilkinson ............. B01D 27/00
                                                           210/249
(Continued)

FOREIGN PATENT DOCUMENTS

EP        0164968 A1    12/1985

OTHER PUBLICATIONS

Co-Pending U.S. Appl. No. 14/333,667, filed Jul. 17, 2014, Inventors: Konruff, M.; Russell, C.; Nguyen, C., (Not Yet Published).
(Continued)

*Primary Examiner* — Minh Truong
(74) *Attorney, Agent, or Firm* — Thompson Coburn LLP (57) ABSTRACT

A lubrication system for a gear box has a backing member. The backing member is configured to allow mounting of a plurality of lubrication components on the backing member. One of the lubrication components comprises a pump configured to pressurize lubricating oil for the lubrication system. The pump has a suction and discharge. The pump suction is removably connectable to the gear box and the pump discharge is removably connectable to piping that is configured to communicate with the gear box. The backing member has a lifting mount arranged along its length and width that corresponds to a center of gravity of the backing member with the lubrication components mounted thereto. The lubrication components are modular and may be replaced and installed as necessary on the backing member.
(Continued)

Multiple like lubrication systems may be provided, and removed and installed on the gear box as needed for maintenance.

9 Claims, 7 Drawing Sheets

(51) Int. Cl.
 *F01M 11/02* (2006.01)
 *F16H 57/02* (2012.01)
(52) U.S. Cl.
 CPC ... *F16H 57/0435* (2013.01); *F01M 2011/021* (2013.01); *F16H 2057/02026* (2013.01)
(58) Field of Classification Search
 USPC .................................. 248/309.1, 220.21, 300
 See application file for complete search history.

(56) References Cited

U.S. PATENT DOCUMENTS

| | | | | |
|---|---|---|---|---|
| 3,223,197 | A * | 12/1965 | Conover | F01M 1/02 184/104.3 |
| 3,321,999 | A | 5/1967 | Greer | |
| 3,765,636 | A * | 10/1973 | Burrell | F17C 13/084 248/313 |
| 4,324,213 | A * | 4/1982 | Kasting | B01D 35/12 123/196 A |
| 4,590,820 | A | 5/1986 | Hambric | |
| 4,655,326 | A | 4/1987 | Osenbaugh | |
| 4,738,111 | A * | 4/1988 | Edwards | F01K 25/08 290/1 A |
| 4,957,187 | A | 9/1990 | Burgess | |
| 5,004,535 | A * | 4/1991 | Bosko | B01D 61/10 210/257.2 |
| 5,092,553 | A * | 3/1992 | Joosse | A47L 11/4083 24/339 |
| 5,125,376 | A * | 6/1992 | Williams | F02B 63/06 123/195 A |
| 5,446,326 | A * | 8/1995 | Scheider | H02K 7/116 310/68 R |
| 5,567,306 | A * | 10/1996 | DeWachter | B01D 35/306 184/6.24 |
| 5,771,854 | A * | 6/1998 | Barton | F01M 1/02 123/196 R |
| 5,967,929 | A | 10/1999 | Matsuoka et al. | |
| 6,202,814 | B1 | 3/2001 | Braford, Jr. | |
| 6,834,634 | B2 * | 12/2004 | Lawrence | F02F 7/0007 123/195 A |
| 7,513,172 | B2 | 4/2009 | Takahashi et al. | |
| 7,966,979 | B2 * | 6/2011 | Olsen | F01N 13/00 123/195 A |
| 8,025,601 | B2 | 9/2011 | Iwasaki et al. | |
| 8,267,826 | B2 | 9/2012 | Duong et al. | |
| 8,601,997 | B2 * | 12/2013 | Cockerill | F01M 5/002 123/195 A |
| 8,702,373 | B1 | 4/2014 | Valva et al. | |
| 9,222,383 | B2 * | 12/2015 | Togo | F01N 13/1811 |
| 2007/0197339 | A1 | 8/2007 | Ryymin et al. | |
| 2009/0159038 | A1 * | 6/2009 | Koyama | F02F 7/0068 123/195 A |
| 2009/0179387 | A1 | 7/2009 | Saenz De Ugarte et al. | |
| 2010/0179011 | A1 | 7/2010 | Demtroder et al. | |
| 2010/0304912 | A1 | 12/2010 | Sime | |
| 2012/0108380 | A1 | 5/2012 | Dinter et al. | |
| 2013/0035190 | A1 | 2/2013 | McCune | |
| 2013/0095974 | A1 | 4/2013 | Imai et al. | |
| 2013/0319006 | A1 | 12/2013 | Parnin et al. | |
| 2014/0041619 | A1 | 2/2014 | Yamauchi | |

OTHER PUBLICATIONS

Co-Pending U.S. Appl. No. 14/457,649, filed Aug. 12, 2014, Inventors: Esterle, T.; Konruff, M.; Nguyen, C.; Russell, C.: Asher, J., (Not Yet Published).

Co-Pending U.S. Appl. No. 14/333,703, filed Jul. 17, 2014, Inventors: Konruff, M.; Nguyen, C., (Not Yet Published).

Co-Pending U.S. Appl. No. 14/453,034, filed Aug. 6, 2014, Inventors: Konruff, M. (Not Yet Published).

Co-Pending U.S. Appl. No. 29/500,903, filed Aug. 29, 2014, Inventors: Nguyen, C., (Not Yet Published).

* cited by examiner

LUBRICATION SYSTEM FOR A GEAR BOX AND ASSOCIATED METHODS

SUMMARY

This disclosure relates to an external lubrication system for a gearbox. In particular, the disclosure relates to a modular, vertically-mounted, external lubrication system for a gearbox. In one aspect, the gearbox may contain a planetary gear train. The planetary gear train may be driven by a motor. The motor may be directly mounted to a housing structure of the gear box. The motor may be connected to the gear train of the gear box with a flexible coupling. The lubrication system for the gear train may be mounted externally to the gear box. In particular, all of the necessary lubrication system components may be mounted to a backing member which is removably connected to the housing of the gear box. Because all of the necessary lubrication system components are mounted to the backing member, the backing member may be removed or installed from the gear box as needed, thereby providing portability and modularity for the lubrication system. For instance, in the event an individual lubrication system component fails, the entire lubrication system as mounted on the backing member may be removed from the gear box and a second lubrication system as mounted on a backing member may be installed on the gear box thereby allowing the gear box to regain operation with the second lubrication system while the first lubrication system undergoes troubleshooting and/or repair. In that regard, the lubrication system may be configured to have minimal connections with the gear box. The connections may be such that they are easily disconnected and reconnected without physical alteration of the piping connections from the gearbox to the lubrication system. To facilitate installation and/or removal, the lubrication system as mounted on the backing plate may have lift mounts that allow its removal and installation on the gear box. For instance, the lift mounts of the backing plate may be configured to maintain the center of gravity with the lubrication system components installed on the backing plate to thereby maintain vertical orientation of the backing plate and lubrication system during installation and removal from the gear box. Additionally, the individual lubrication system components may be mounted on the backing plate to allow their individual removal therefrom. For instance, the individual lubrication system components may have flange connections, which are easily connected and disconnected, or other quick disconnect type connections therebetween, to allow removal and installation of one or more components, as needed, without physical alteration of the adjacent components or the piping systems between the components. In this way, individual components of the lubrication system as mounted on the backing member may be modular and portable.

To facilitate installation and/or removal of the lubrication system with the gear box, brackets may be provided. The brackets may have a gear box mounting surface that allows the bracket to be mounted to the gear box. The bracket may also have a backing member mounting surface that allows the bracket to be mounted to the backing member. The bracket backing member mounting surface and gear box mounting surfaces may be slotted to facilitate alignment during removal and installation of the lubrication system on the gear box. Additionally, the backing member may have slots at a backing member bracket connection location to facilitate installation of the bracket on the backing member. The slots of the bracket and backing member may provide three dimensional movement to accommodate larger fabrication tolerances. The lubrication system may be manufactured with larger fabrication tolerances and may be constructed independent of the gear box.

DETAILED DESCRIPTION

Figure 1:
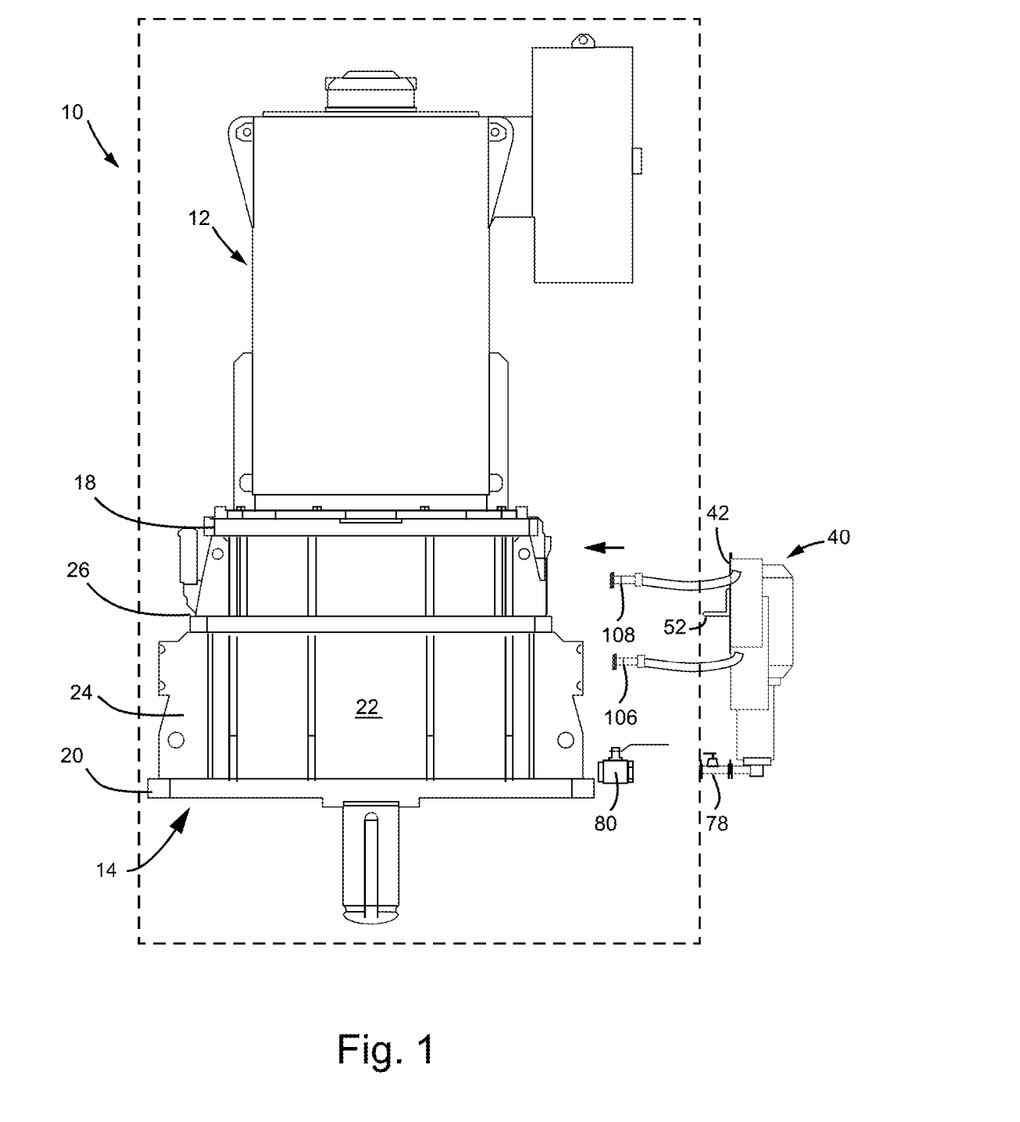
FIG. 1 is a exploded view of a vertical gear motor and a lubrication system.
Figure 2:
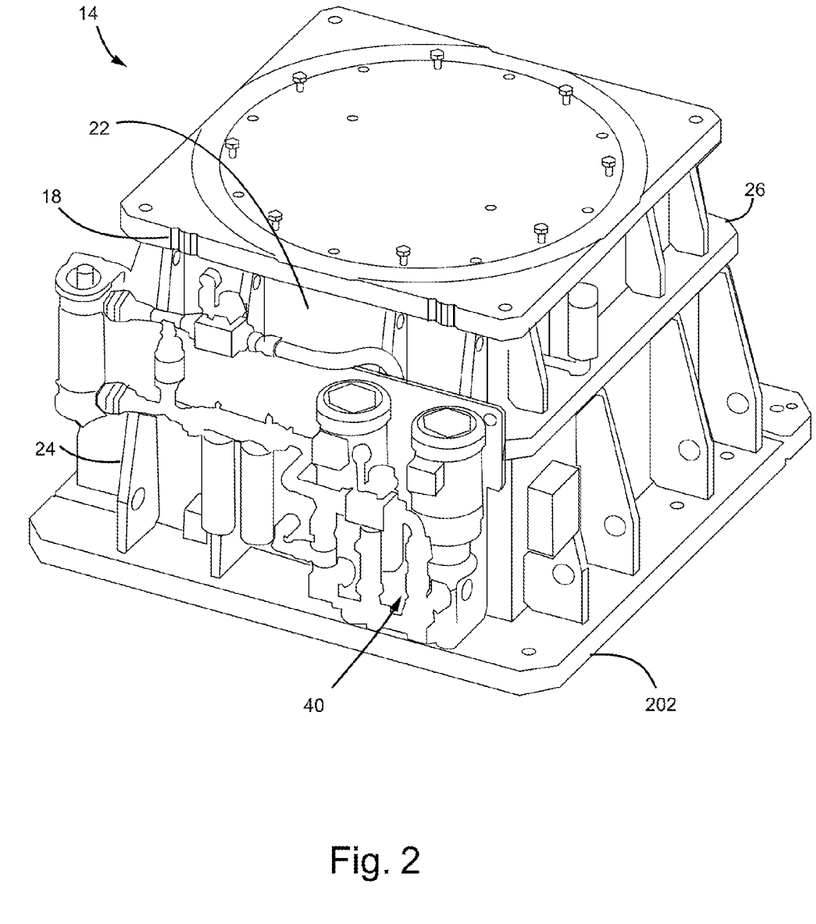
FIG. 2 is a perspective view of a gear box with the lubrication system mounted in a vertical orientation external to the gear box.
Figure 3:
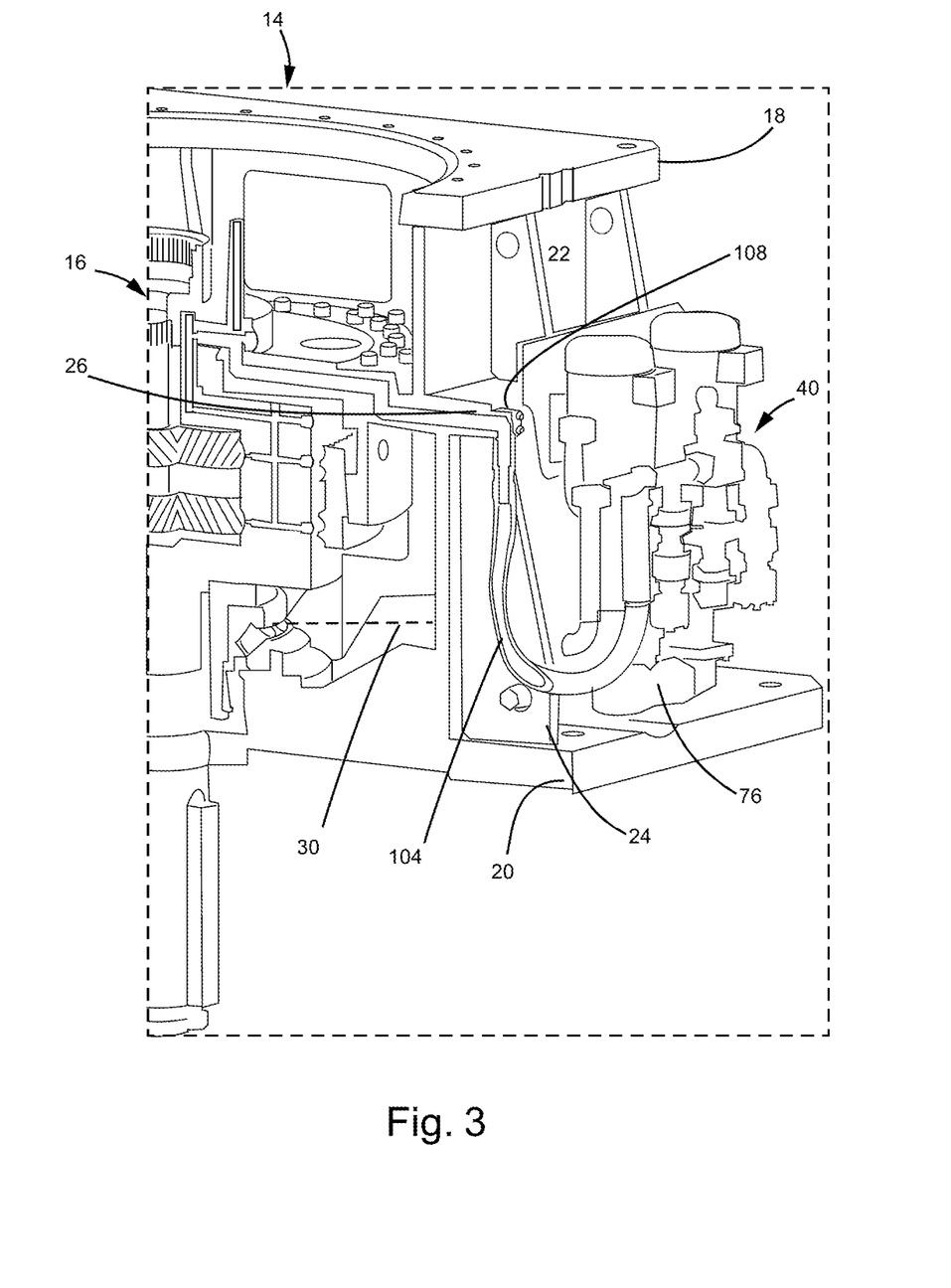
FIG. 3 is a partial, perspective cross sectional view of the gear box of FIG. 2, showing exemplary connection points of the lubrication system to the gear box.

An exemplary application is shown in the drawings and is not intended to be limiting in any sense. With reference to FIGS. 1-3, a vertical gear motor unit 10 comprises a motor 12 and a gear box housing 14 containing a gear train 16. The housing 14 may comprise a fabricated housing including a top weldment plate 18 which provides a mount for the motor 12. Opposite the top weldment plate 18, the housing 14 may be provided with a base weldment plate 20. The base weldment plate 20 may provide a mount to a driven load (not shown), for instance, a pump. Between the top and base weldment plates 18,20, side walls 22 are provided. Together the top weldment plate 18, base weldment plate 20, and side walls 22 define a hollow interior of the housing in which the gear train 16 is disposed. The housing 14 may also have side flanges 24 extending between the top weldment plate 18 and the base weldment plate 20 to provide structural support for the side walls 22. The side flanges may be shaped to accommodate the lubrication system being mounted to the housing. Depending upon the application, the housing may also be provided with an intermediate support plate 26. The intermediate support plate 26 may be disposed between the top weldment plate 18 and the base weldment plate 20 and extend into the interior of the housing from its connection with the side walls. For instance, components of the gear train may mount to the intermediate support plate. Depending upon the application, the housing need not have an intermediate support plate and/or side flanges.

A portion of the interior of the housing 14 may form a sump 30 for collecting lubricating oil for the gear train. Depending upon the application, a lower portion of the interior of the housing may comprise the sump 30, for instance, when the housing is only partially filled with lubricating oil. A lubrication system 40 as described herein may communicate with the interior of the housing 14, including the sump through connections extending through the structural members of the housing. Depending upon the application, oil from the lubrication system may be directed through the intermediate support plate 26 or through the top weldment plate. Oil from the sump may be directed through the side wall 24 to the lubrication system. The gear train may be lubricated and sealed as set forth in application Ser. Nos. 14/333,703 and 14/333,667, the disclosures of which are incorporated by reference herein.

With reference to FIGS. 4-7, the lubrication system 40 comprises a backing member 42. The backing member 42 may have a length L that extends in a length direction and a width W extending in a width direction. The backing member 42 may have different widths at different locations along the length L to accommodate the lubrication component to be mounted to the backing member at the particular location on the backing member. The backing member 42 may have a component mounting side 44 and an opposite, housing mounting side 46. The component mounting 44 side may be generally flat to allow the mounting of components thereon. The housing mounting side 46 may be flat to facilitate mounting of the backing member to the housing. The backing member 42 may be a planar member. The housing mounting side 46 may be shaped to cooperate with the housing side flanges 24 and intermediate support plate to allow mounting of the backing member 42 to the housing 14. The backing member 42 may have a plurality of lubrication system component mounting holes 48. The lubrication system components may be mounted directly to the backing member 42 using mechanical fasteners, and as needed, component brackets or pipe hangers extending between the component and the backing member. The use of mechanical fasteners allows the lubrication components to be installed and removed from the backing member as desired.

Figure 6:
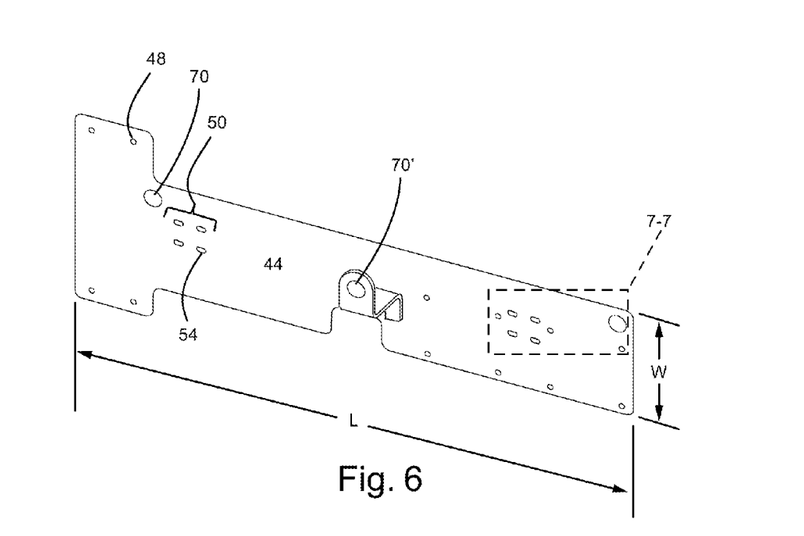
FIG. 6 is a perspective view of the backing member of FIG. 4 without lubrication components.
Figure 7:
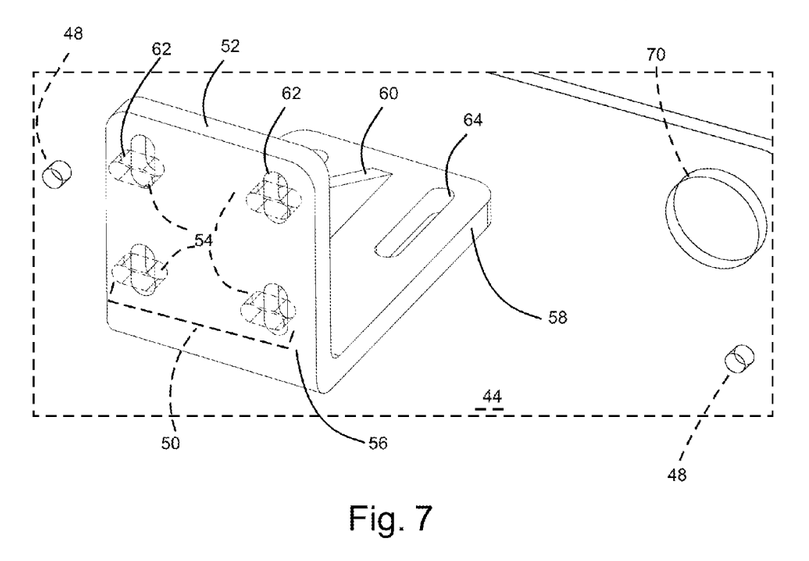
FIG. 7 is an enlarged view of detail area 7-7 of FIG. 6 with the backing member shown in phantom.

The backing member 42 may have a main mounting bracket connection location 50. The main mounting bracket connection location 50 may be configured to receive a bracket 52. The bracket 52 may facilitate mounting of the backing member 42 to the housing 14. The bracket connection location 50 may comprise a slot 54. A plurality of slots may be provided at the bracket connection location. The bracket connection location slot 54 may be elongated in a direction. The plurality of slots 54 of the bracket connection location may be elongated in the same direction. For instance as shown in FIG. 7, the backing member bracket connection location slots 54 are elongated in the length L direction. Additionally as shown in FIG. 7, four slots are provided for backing member bracket connection location 50. More or less slots may be provided as desired. As shown in FIG. 6, two backing member bracket connection locations 50 are provided. The bracket connection locations may be provided on other areas of the backing member, and one or more than one connection may be provided.

The main mounting bracket 52 may have a general L-shaped cross section. The main mounting bracket 52 may have a backing member mounting surface 56 and a gear box mounting surface 58 arranged generally perpendicularly to the backing member mounting surface. The bracket 52 may be provided with a gusset 60 between the backing member mounting surface 56 and the gear box mounting surface 58 to maintain structural integrity for the bracket. The bracket backing member mounting surface 56 may have a slot 62. The slot 62 may be elongated in a direction that is perpendicular to the direction of the backing member bracket location connection slot 54. For instance as shown in FIG. 7, the bracket backing member mounting surface slot 62 is arranged vertically (i.e., in the width W direction relative to the backing member) and the backing member bracket location connection slot 54 is arranged horizontally (i.e., in the length L direction relative to the backing member).

While FIG. 7 shows the slots of the bracket backing member mounting surface and the backing member bracket location connection being arranged horizontally and vertically, the slots may also be arranged on other angles, and preferably perpendicular to each other. The bracket backing member mounting surface 56 may have a plurality of slots 62. The plurality of slots 62 may correspond to the plurality of slots 54 provided on the backing member connection location 50. The bracket connection location 50 may have more slots than provided on the bracket backing member mounting surface 56 to allow versatility and flexibility in mounting the bracket 52 to the backing member 42. The bracket gear box mounting surface 58 may also have a plurality of slots 64 (for instance, on both sides of the gusset 60) to facilitate alignment of the bracket 52 with the housing 14. Together the slots 54 provided in the bracket connection location, the slots 62 of the bracket backing member mounting surface 56, the slots 64 of the bracket gear box mounting surface 58 allow for three dimensional movement between the backing member 42 and the housing 14 to facilitate mounting of the backing member on the housing. Accordingly, larger fabrication tolerances may be used to manufacture the gear box housing 14 and the backing member 42. While the main mounting bracket 52 is shown with an "L"-shaped cross section, other shapes may be used for the bracket. For instance, an "L"-shaped cross section bracket facilitates installation of the bracket gear box mounting surface 58 on portions of the intermediate support plate 26, as shown in the drawings. Depending upon the desired mounting location on the gear box housing, other shaped brackets may be used.

The backing member 42 may be provided with a lift mount 70 to facilitate removal and installation of the lubrication system on the gear box housing. The lift mount 70 may comprise a plurality of eye holes provided on the backing member 42. For instance, eye holes may be provided on longitudinal opposite ends of the backing member. Additionally, the lift mount may be configured to accommodate the center of gravity of the backing member with the lubrication components installed thereon to facilitate the maintaining of a vertical orientation of the backing plate during removal and installation of the backing plate on the gear box housing. The lift mount 70 may include one or more lift locations 70' (e.g., arranged in a center portion of the backing member) that are arranged in a direction that is orthogonal to the length L and width W of the backing member.

Figure 4:
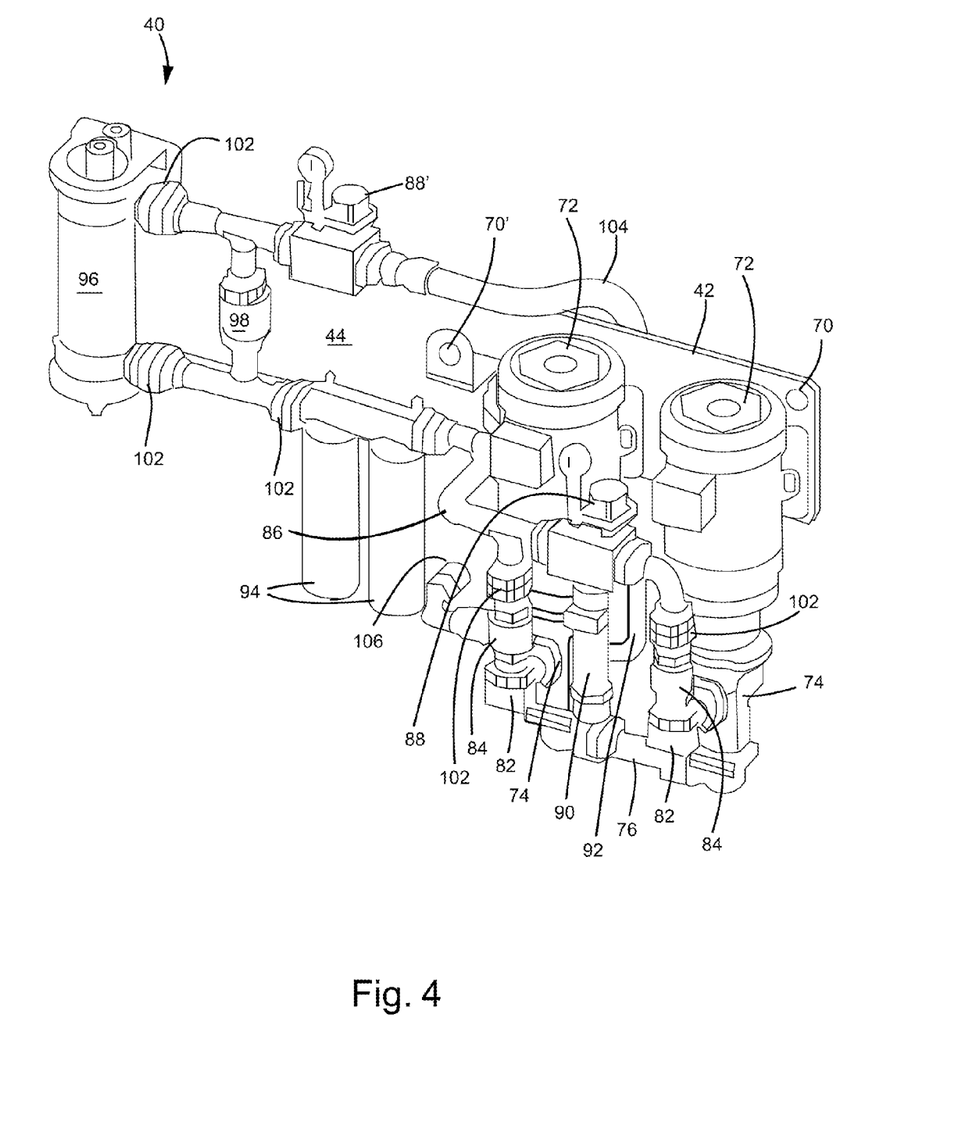
FIG. 4 is a perspective view of a backing member with lubrication system components mounted thereon.

As best shown in FIG. 4, the lubrication system 40 may have a plurality of lubrication components mounted on a component mounting side 44 of the backing member 42. The lubrication system components may comprise first and second motors 72 mounted to the backing member 42. Each motor may drive a pump 74. The pumps 74 may be placed in parallel and may draw a suction from a common suction line 76. The common suction line 76 may be in communication with the sump 30 of the gear box housing 14. The common suction line 76 may comprise hard or rigid piping. For instance, a hard or rigid piping may reduce frictional flow losses in comparison to flexible hose for a given operational envelope size of the lubrication system as a flexible hose may require a certain bend radius. A flexible hose may tend to have larger frictional flow losses and tends to increase the size of the operational envelope of the lubrication system to accommodate any required bend radiuses in the flexible hosing. The pumps 74 may be configured as main and backup pumps to provide redundant pressure sources in case of failure. For instance, in the case of low pressure due to failure of a main pump, the standby pump may be made operational to supply lubricating oil to the gear train. Additionally, pump operation may be switched to normalize run times. During normal lubrication system operation, the main pump may direct oil through the system with the backup pump being aligned in stand-by to augment lubricating oil pressure as needed. A sump isolation valve 78 (FIG. 8) may be provided in the common suction line 76 to isolate the sump 30 from the suction 76 of the pumps 74. For instance, the sump isolation valve 78 may be closed and the downstream flange of the sump isolation valve and an abutting flange of the suction line 76 may be disconnected to facilitate removal and installation of the lubrication system from the gear box housing 14. The pumps 74 may each have a discharge 82 that supplies pressurized lubricating oil to the other components of the system and to the gear box housing. Each pump discharge 82 may have a check valve 84 to prevent reverse flow through a non-operating pump while the other pump is operating. For instance, the check valve 84 of the discharge 82 of the backup pump prevents back flow through the backup pump during operation of the main pump. The discharge of each pump may be in communication with a discharge header 86. The discharge header 86 may be in communication with a pressure sensor 88.

Figure 5:
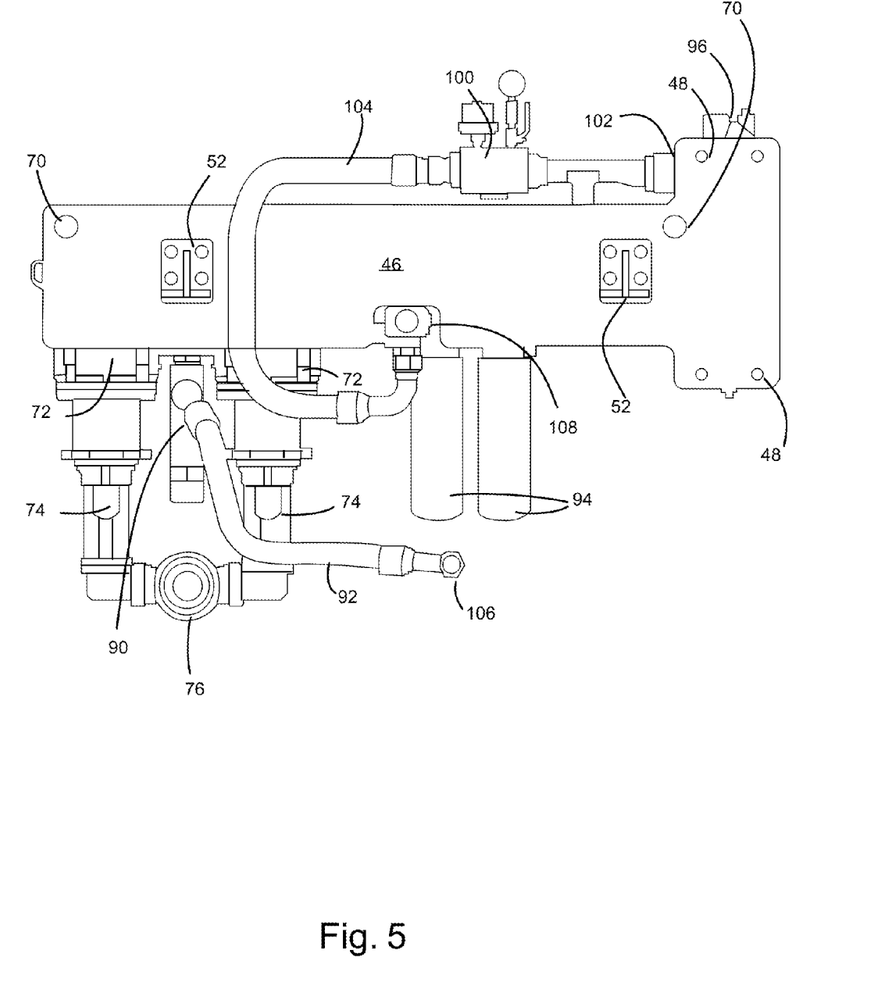
FIG. 5 is a plan view generally opposite of the view of FIG. 4 showing the backing member with lubrication system components mounted thereon.
Figure 8:
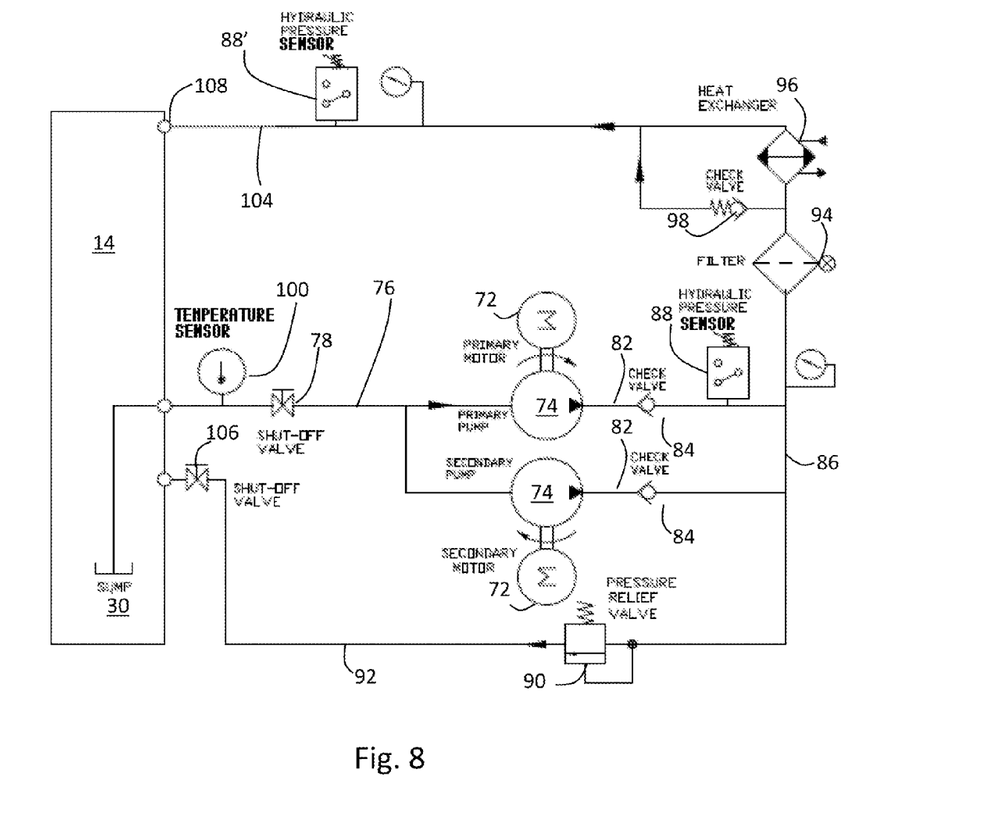
FIG. 8 is a schematic diagram of an embodiment of a lubrication system, for instance, the lubrication system as shown in FIGS. 1-5.

Pressure sensors 88,88' may be configured to monitor the lubrication system oil pressure and ensure adequate pressure is present in the system. The pressure sensor 88 of the pump discharge header 86 may be configured to monitor the pump outlet pressure. The pressure sensor 88' of the gear box inlet may be configured to monitor oil pressure delivered to the gear box. The pressure sensors 88,88' may include gages for local visual readings of pressures, for instance, in the discharge header 86 and gear box inlet. The pressure sensors 88,88' may comprise switches that provide direct control to lubrication system components. The pressure sensors 88,88' may include control circuitry that provides signals to a control associated with one or more of the lubrication system components. The pressure sensor may be configured with one or more settings that upon activation provide control signals that interface with the electronic or electrical controls of components of the system, or interface with mechanical actuators of components of the system. For instance, one setting of the pressure sensor may correspond to a pressure at which a second pump is energized, for instance, to raise lubricating oil pressure. For instance, the pressure sensor 88 may be configured for such a purpose. Another setting of the pressure sensor may correspond to a pressure at which an alarm is energized and/or the main motor 12 is de-energized to secure the entire system, for instance, in the event of low lubricating oil pressure. For instance, the pressure sensor 88' may be configured for such a purpose. Another setting may correspond to a pressure at which an alarm is energized and/or the main motor 12 is de-energized to secure the entire system, for instance, high lubricating oil pressure. Another setting of the pressure sensor(s) may correspond to a pressure at which a secondary pump already running may be deenergized. For instance, the pressure sensor 88 may be configured for such a purpose. Another setting of the sensor may correspond to a pressure at which a relief valve 90 (FIG. 8) is actuated. For instance, the pressure sensor 88 and the relief valve 90 may be integral and include mechanical and/or electrical actuation. The relief valve 90 may discharge lubricating oil back to the gear box sump 30 to relieve system pressure. For instance, as best shown in FIGS. 5 and 8, a high pressure relief line 92 extends from the relief valve discharge 90 to the sump 30. One or more additional pressure sensors may be configured in a like manner and may be located at other points in the system to monitor pressure, for instance, at the main inlet to the gear box housing. While pressure sensors are described and shown in the drawings, one or more flow sensors, or a combination of flow and pressure sensors, may be configured in a similar manner to the pressure sensor, and/or located at other points in the system to monitor flow, for instance, at the main inlet to the gear box housing.

Downstream of the pump discharge header 86, one or more filters 94, and/or a heat exchanger 96 may be provided. The heat exchanger 96 may include a heat exchanger bypass valve 98. The heat exchanger bypass valve 98 may be controlled by line pressure or oil temperature downstream of the heat exchanger 96. For instance, the bypass valve may become more open when line pressure exceeds a desired limit. In such a configuration, the bypass valve may have a valve body biased by a spring to set the desired limit. The bypass valve may also be controlled with a control system driven by pressure sensors, including the aforementioned pressure sensors 88,88'. In an alternate configuration, a temperature sensor may be provided to sense temperature upstream of the heat exchanger and operate the bypass valve 98 accordingly. For instance, when the temperature of the lubricating oil is low, the temperature sensor may generate signals that control the bypass valve 98 to fully open the bypass valve thereby allowing lubricating oil discharged from the pumps to flow directly through the bypass valve and into the gear box inlet. Once temperature of the lubricating oil increases to a sufficient level, the temperature sensor may generate signals that control the heat exchanger bypass valve 98 to throttle back flow therethrough, thereby directing the flow of lubricating oil through the heat exchanger 96.

A system temperature sensor 100 may also be provided to sense overall system lubrication oil temperature and ensure correct operational temperatures are maintained in the system. The temperature sensor 100 may comprise a switch that provides direct control to lubrication system components. A temperature sensor 100 may be provided to sense temperature of oil in the sump of the gear box. A temperature sensor 100 may include control circuitry that provides signals to a control associated with one or more of the lubrication system components. The temperature sensor 100 may include gages for local visual readings of temperature. The temperature sensor 100 may sense lubricating oil temperature and if the temperature becomes sufficiently high, the temperature sensor may be configured to send a signal to shut down operation of the main motor unit 12. The temperature sensor 100 may sense lubricating oil temperature and if the temperature is too low, the temperature sensor may be configured to send a signal to inhibit starting of the pump motors 72 or engage a heating element to warm the oil. One or more additional temperature sensors may be configured in a like manner and may be located at other points in the system to monitor temperature, for instance, at the effluent of the heat exchanger.

Individual lubrication components may be placed in communication with each other with flange connections or other quick disconnect type connections 102 to allow the individual components to be modular and to facilitate removal and replacement of the individual components as necessary without physical alteration of the components or the piping or other components mounted on the backing member. All or some of the lubrication components may have flange connections or other quick disconnect type connections 102. Piping extending from the lubricating system to the main inlet of the gear box may comprise a flexible hose 104. A flexible hose 104 facilitates removal and installation of the lubrication system on the gear box housing without physical alteration of the connections to the gear box and to accommodate variation among the removed and installed lubrication systems. The relief valve discharge line 92 may also comprise flexible hose for the same purpose.

When maintenance on a lubrication system 40 is required, the entire lubrication system may be removed from the gear box and replaced with an operational spare. System troubleshooting may then occur offline on the removed lubrication system. Individual components that need to be replaced may be removed from the backing member 42 by detaching the connections 102 between the individual components. Individual lubrication system components may be modular to allow for their change out and replacement during maintenance. By providing a lubrication system with a backing member 42 that supports all of the necessary lubrication system components, the system may be completely installed and/or removed from the gear box housing with minimal amounts of connections/disconnections and without physical alteration of the piping associated with the gear box and/or the lubrication system. For instance, as shown in FIG. 5, the lubrication system may be removed from the housing by disconnecting the suction line 76 at the suction isolation valve 78, a gear box connection 106 of the high pressure relief line 92, and a gear box connection 108 of the gear box inlet line 104. Providing multiple lubrication systems 40 that are interchangeable on the gear box provides operational flexibility. For instance, when a component fails on a first lubrication system, the first lubrication system may be removed from the gear box and the second operational spare may be installed thereon to continue operations with minimal downtime. Multiple lubrication systems may be provided for a gear box motor unit, and gear box motor unit operators may be instructed to remove one lubrication system and install a second lubrication system in order to perform troubleshooting offline on the first lubrication system. Instructions may include instructions for providing brackets with slots that cooperate with the slots of the backing member of the lubrication system to allow for installation and removal thereof. The lubrication system may be sold or distributed as part of a gear box housing as a separate unit to be added to a gear box housing (e.g., to replace a lubrication system of an existing gear box housing). In connection with the sale or distribution of the lubrication system, a user (e.g., a purchaser of the lubrication system) is instructed that the purpose of the lubrication system is to replace, remove, and/or install the lubrication system on a gear box housing and/or perform trouble shooting of a lubrication system off-line. The user is induced to replace, remove, and/or install the lubrication system on a gear box housing.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A lubrication system for a gear box, the lubrication system comprising a backing member having a length extending in a length direction and a width extending in a width direction with opposite first and second sides extending in the length and width directions, the backing member having a bracket connection location on its first side wherein the backing member is removably connectable to the gear box at the bracket connection location, the backing member bracket connection location having at least one slot extending in a backing member slot direction, the backing member having a plurality of lubrication components for the lubrication system mounted to the backing member second side, at least one lubrication component comprising a pump configured to pressurize lubricating oil for the lubrication system, the pump being removably mounted to the backing member second side, the pump having a suction configured for drawing lubricating oil from the gear box and a discharge configured for delivering lubricating oil to the gear box, the suction being removably connectable to the gearbox, the discharge being removably connectable to piping configured to communicate with the gearbox, the backing member having a lifting mount on a projection extending from the backing member, the lifting mount being arranged at a location along the backing member length and the backing member width and along an axis orthogonal to the length direction and width direction at a center of gravity of the backing member with the lubrication components mounted to the backing member.

2. The system of claim 1 wherein the lubrication components further comprise at least one of a filter, a heat exchanger, a valve, and a sensor.

3. The system of claim 1 wherein at least a portion of the piping configured to communicate with the gearbox and the pump discharge comprises flexible hose.

4. The system of claim 1 wherein the piping configured to communicate with the gearbox is removably connectable with the gearbox.

5. The system of claim 1 wherein the connection of the pump suction to the gearbox comprises rigid pipe.

6. The system of claim 1 further comprising at least two adjacently mounted lubrication components each having a lubricating oil inlet and outlet, and the lubricating oil outlet of one mounted lubrication component is removably connecteable with the lubricating oil inlet of the adjacently mounted lubrication component.

7. The system of claim 1, wherein the backing member is planar.

8. The system of claim 1, wherein the backing member slot direction is parallel to at least one of the length direction and the width direction.

9. The system of claim 1, further comprising a bracket having a gearbox mounting surface and backing member mounting surface, bracket being removably connectable to the gear box at the bracket gear box mounting surface, the bracket backing member mounting surface having at least one slot extending in a direction perpendicular to the backing member slot direction, the bracket being removably connectable to the backing member bracket connection location at the bracket backing member mounting surface.

\* \* \* \* \*